United States Patent [19]

Wissmann

[11] Patent Number: 4,779,268
[45] Date of Patent: Oct. 18, 1988

[54] FRAME DECODING FOR DIGITAL SIGNAL TRANSMISSION

[75] Inventor: Manfred Wissmann, Munich, Fed. Rep. of Germany

[73] Assignee: Siemens Aktiengesellschaft, Berlin and Munich, Fed. Rep. of Germany

[21] Appl. No.: 12,423

[22] Filed: Feb. 9, 1987

[30] Foreign Application Priority Data

Feb. 10, 1986 [DE] Fed. Rep. of Germany ....... 3604114

[51] Int. Cl.$^4$ ............................................. H04J 3/06
[52] U.S. Cl. .................................. 370/100; 375/106
[58] Field of Search ............... 370/100; 375/106, 111, 375/116

[56] References Cited

U.S. PATENT DOCUMENTS

| | | | |
|---|---|---|---|
| 3,541,456 | 11/1970 | Feder ............................... | 375/116 |
| 4,002,845 | 1/1977 | Kaul et al. ....................... | 370/100 |
| 4,159,535 | 6/1979 | Fuhrman .......................... | 375/116 |

FOREIGN PATENT DOCUMENTS 3132198  3/1983  Fed. Rep. of Germany .

OTHER PUBLICATIONS

IEEE International Conference on Communications, Proceedings—Jun. 1974, PCM Receiving Equipment of a 640 Mbits/S Waveguide Transmission System Using Integrated Circuits.

Multiplexers for 8.448 Mbit/S in Positive-Negative Stuffing Technology by U. Assmus, Nachrichtentechnische Fachbertichte, 42 (1972) pp. 245–256.

Siemens Digital Signal Multiplex Device DSMX8/34, Apr. 1983.

Primary Examiner—Robert L. Griffin
Assistant Examiner—Marianne Huseman
Attorney, Agent, or Firm—Hill, Van Santen, Steadman & Simpson

[57] ABSTRACT

A method and apparatus for frame decoding, in a system which has a series bit data flow with a frame structure including a periodically occurring item of synchronizing information which characterizes the start of each frame, uses a synchronizing bit as synchronizing information. A logic AND-link is perfomed, with data in successive search frames until only one bit, the synchronizing bit, in the search frame is set at logic "1" and this setting is retained for a plurality of search frames. A synchronizing signal, corresponding to the time position of the synchronizing bit, is generated and the bit flow and/or the synchronizing signal are delayed so that the synchronizing signal occurs in synchronism with a delayed bit flow.

10 Claims, 4 Drawing Sheets

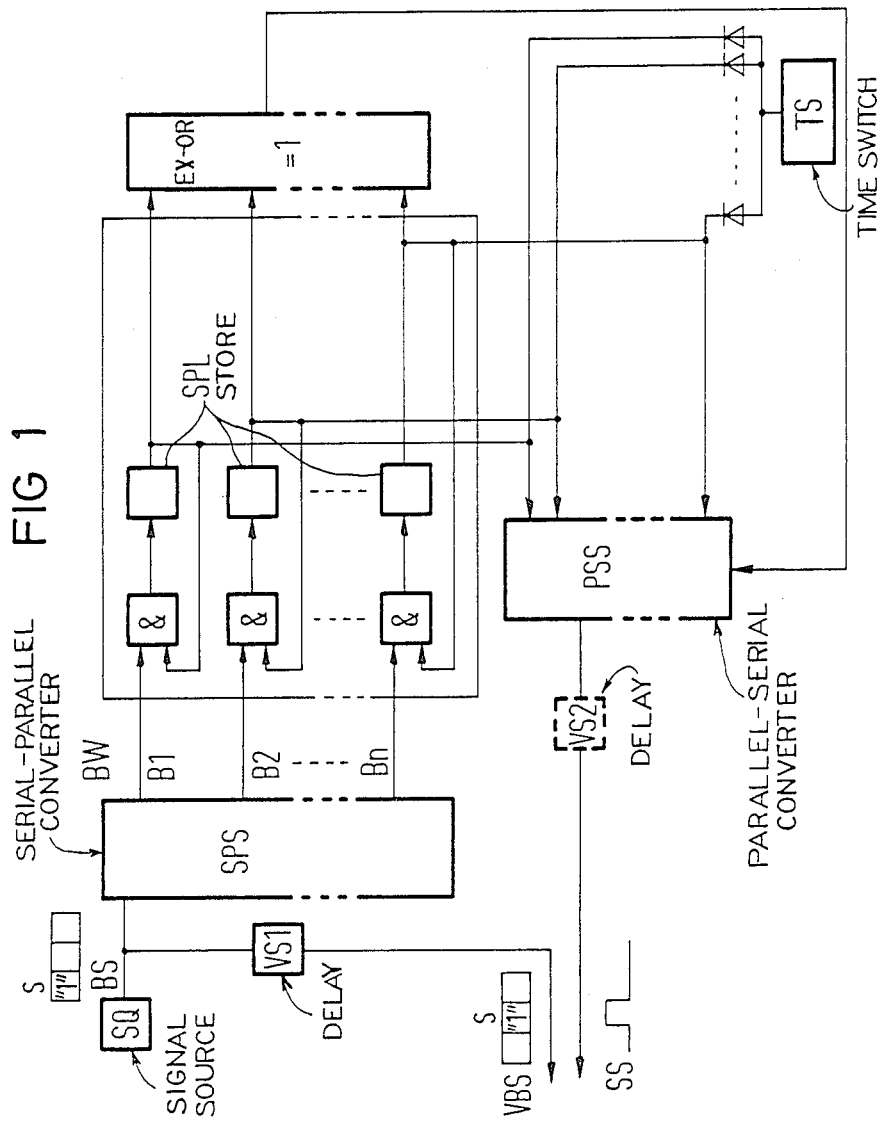

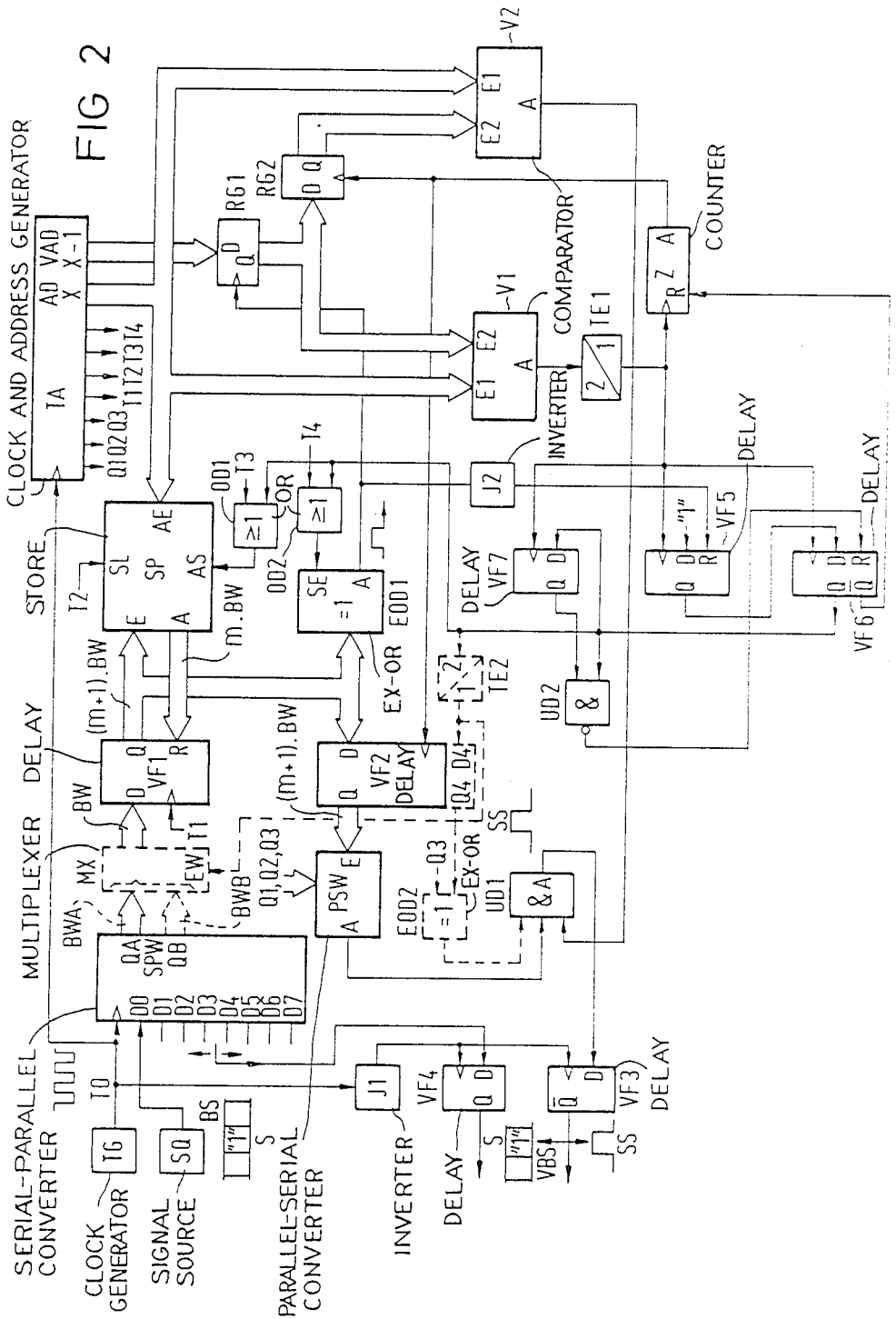

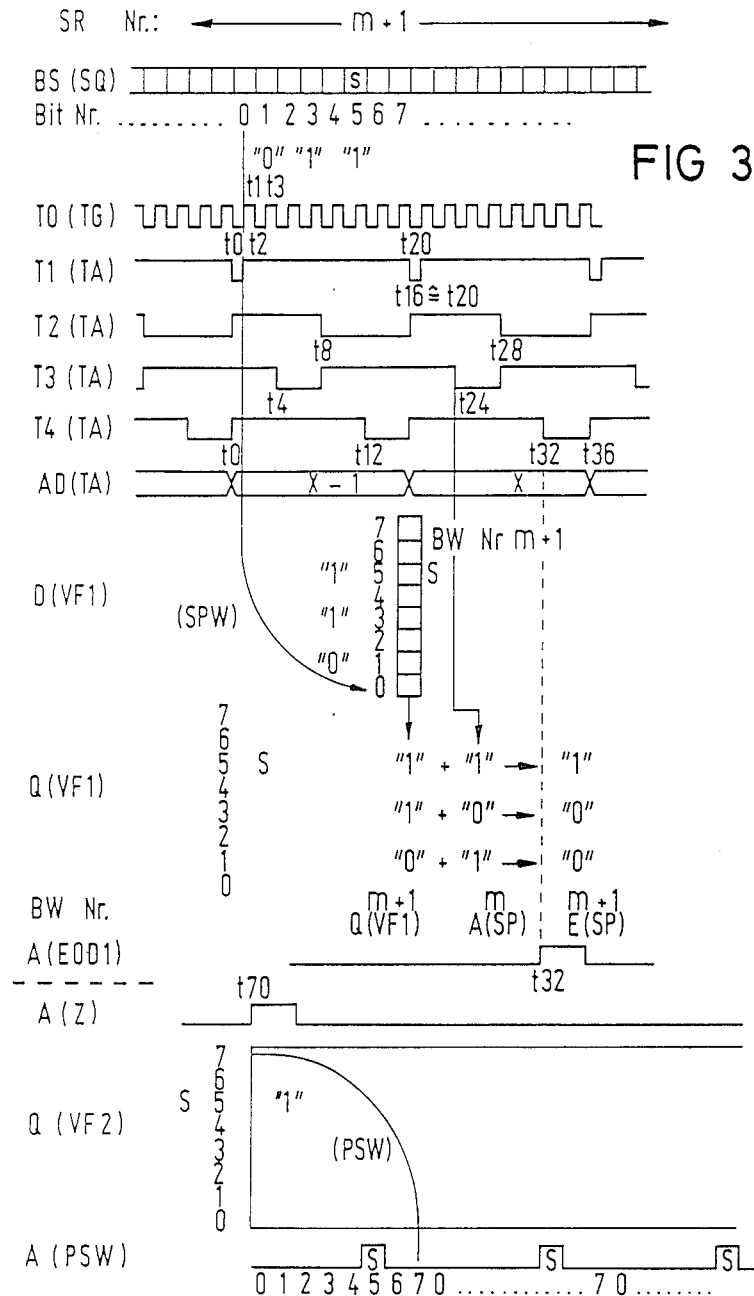

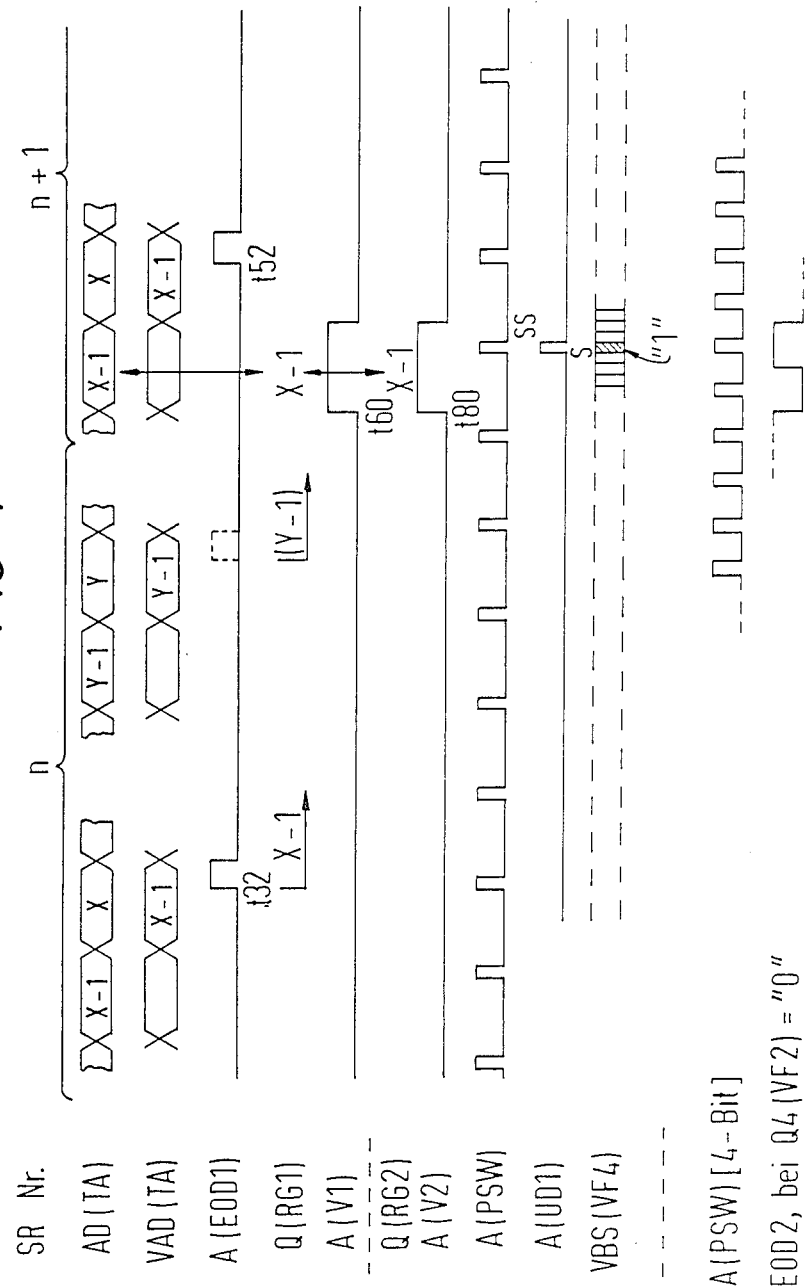

FRAME DECODING FOR DIGITAL SIGNAL TRANSMISSION

The invention relates to a method of frame decoding, and more particularly to such a method used in a transmission system having a frame structure and a recurring item of synchronizing information which marks the start of each frame.

BACKGROUND OF THE INVENTION

To an increasing extent digital signal devices are being used in transmission technology, in particular over radio relay links. For the additional transmission of information bits for service channel purposes and message purposes, such devices require a multiplexer-demultiplexer with a so-called super-frame structure.

The publication "Multiplexers for 8.448 Mbit/s in Positive-Negative Stuffing Technology" by U. Assmus and others (see communication from the Research Institute of the FTZ of the German Post Office in Darmstadt, published in "Nachrichtentechnische Fachbertichte" 42 (1972), pp. 245-256) states the following. The combination of a plurality of PCM basic systems to form a system of the second order for the more efficient transmission of digital signals over long distances will form an effective preliminary stage of a digital network and can be constructed using multiplexers without transmission losses. As a synchronous digital network cannot be expected to exist in the near future, asynchronous multiplexers should be of significance for a long transition period. Amongst asynchronous multiplexers, the multiplexer featuring "positive-negative" stuffing technology appears to have special significance. In the receiving section of the multiplexer-demultiplexer system, synchronism between transmitter and receiver is established in a synchronizing device. For this purpose a periodically recurring synchronizing word is transmitted in the bit flow in the generally conventional manner. The synchronizing word provides the bit flow with a frame structure, where the start of each frame is marked by the synchronizing word.

As stated in the description of the Siemens Digital signal multiplex device DSMX8/34, a frame codeword consisting of 10 bits is used at the start of the pulse frame. In the frame synchronizing circuit a shift register is shifted relative to the bit flow until, via a logic-link, the frame codeword is recognized at the outputs of the shift register.

BRIEF SUMMARY OF THE INVENTION

The aim of the invention is, in a digital radio relay device, to provide a method of frame decoding which, even when so-called cluster disturbances occur on the transmission link, facilitates a high-speed, reliable synchronization of the receiving device.

This aim is fulfilled in accordance with the present invention by detecting the synchronizing information by observing a single data bit which maintains a given binary value for plural frames after all other data bits at corresponding positions in different frames have changed their binary values.

Cyclic pulse disturbances can result in total breakdowns of all the network components. In postal networks, the effects of such disturbances are not so serious as resynchronization takes place in approximately 1-2 ms. In the case of enciphered transmission, however, resynchonization of the cipher devices takes approximately 50-100 ms.

The method in accordance with the invention improves the level of freedom from disturbances since a bit in the form of synchronizing information is adulterated less often than a frame codeword.

Since the circuit arrangement corresponding to the invention does not generate a new synchronizing signal during the search process and/or the absence of the synchronizing bit, whereas in fact the new synchronizing signal is emitted only following a predetermined number of correctly recognized synchronizing bits, the level of resistance to missynchronization is improved. During the search process and in particular when disturbances occur, once the synchronizing signal has been generated it continues to be emitted unchanged.

BRIEF DESCRIPTION OF THE DRAWINGS

In the following, the invention will be described in detail in the form of an exemplary embodiment which is illustrated in the drawings in which:

FIG. 1 is a block circuit diagram of a circuit arrangement for frame decoding, incorporating an illustrative embodiment of the present invention;

FIG. 2 is a diagram of the circuit arrangement for frame decoding; and

FIGS. 3 and 4 are pulse diagrams which assist an explanation of the circuit arrangement for frame decoding.

DESCRIPTION OF THE PREFERRED EMBODIMENT

FIG. 1 represents a signal source SQ which supplies a bit flow BS to a series-parallel converter stage PS. Here, the signal source SQ can, for example, represent the receiving component of a demultiplexer. From the series bit flow BS, the series-parallel converter stage SPS produces a parallel bit word BW which consists of bits B1, B2, Bn.

The bits B1 to Bn each occur at the first inputs of undesignated AND-gates. The outputs of the AND-gates are connected to store locations SPL. The store locations SPL can form part, for example, of a random access memory (RAM) or write-read store. The outputs of the store locations SPL are connected to inputs of an undesignated EXCLUSIVE-OR-gate, to inputs of a parallel-series converter stage PSS, and in each case to another input of the assigned AND-gates. The terminal of a time switch stage ZS is connected via decoupling diodes to the other inputs of the AND-gates.

At the start of the decoding procedure, the time switch stage ZS supplies te other inputs of the AND-gates with a logic "1" so that the bits B1, B2, ..., Bn, i.e. the bit word BW emitted from the series-parallel converter stage SPS, is input into the store locations SPL. During the decoding procedure the bits B1 to Bn of the m-th bit word BW in the store locations SPL are AND-ed, via the AND-gates, with the bits B1 to Bn of the following (m+1)-th bit word BW. The invention is based upon the principle that the bits, set at logic "0", of the n-th bit word Bw in the store locations SPL set the corresponding bits of the (m+1)-th bit word BW at logic "0", and these bits, set at logic "0", of the (m+1)-th bit word BW are input into the store locations SPL. Logic ones of bits of the m-th bit word in the store locations SPL are overwritten by logic zeros of the corresponding bits of the (m+1)-th bit word BW.

The result which can be obtained at the outputs of the AND-gates is continuously input into the store locations SPL. Thus, during the decoding procedure the only bit amongst the bits B1 to Bn of the bit word BW in the store locations SPL to remain set at logic "1" is that which always exhibits a logic "1" at the output of the series-parallel converter stage SPS. This bit is the synchronizing bit S, which by virtue of its definition is represented by a periodically recurring logic "1" in the bit flow BS.

If only one of the bits B1 to Bn in a bit word BW in the store locations SPL exhibits a logic "1", the EXCLUSIVE-OR-gate emits a signal to an undesignated switching input of the parallel-series converter stage PSS which converts the bit word BW, contained in the store locations SPL, into a series bit sequence. This bit sequence is a synchronizing signal SS. The bit flow BS is converted in a first delay stage VS1 into a delayed bit flow VBS for time matching to the synchronizing signal SS. The delay time of the first delay stage VS1 and/or the delay time of the second delay stage VS2 which serves to delay the synchronizing signal SS, are selected to be such that the synchronizing bit S in the delayed bit flow VBS occurs simultaneously with the synchronizing signal SS.

FIG. 2 shows the signal source SQ known from FIG. 1, which supplies the likewise known bit flow BS with the synchronizing bit S to an input DO of a series-parallel converter SPW. A clock generator TG emits a clock pulse sequence TO to the clock inputs of the series-parallel converter SPW and a clock-and address preparation stage TA. The clock- and address preparation stage TA emits first to third clock drive pulses Q1, Q2, Q3, first to fourth clock pulse sequences T1, T2, T2, T4 and, in cyclic fashion, an address AD and a preceding address VAD. The clock drive pulses Q2 and Q3 each have half the frequency of the preceding clock drive pulses, Q1 and Q2, respectively, where the first clock drive pulses Q1 have half the frequency of the clock pulse sequence TO.

In the series-parallel converter SPW, which consists for example of an eight-stage shift register, the series bit flow BS is continuously split into bit words BW which have a breadth of 8-bits.

In FIG. 2, only one of eight parallel elements in the 8-bit wide path is shown explicitly, it being understood that the others are connected in the same manner, for the respective bit positions of the 8-bit buses identified as wide arrows in FIG. 2.

The following description is based on the assumption that the frame length in the bit flow BS, i.e. the number of bits between two synchronizing bits S plus the synchronizing bit S, is a multiple of eight.

This bit word BW, the breadth of which amounts to 8bits, is emitted from an output QA of the series-parallel converter SPW and occurs at an input D of a first delay flip-flop VF1. The first clock pulse sequence T1 is supplied to the clock input of the first delay-flip-flop VF1. An output Q of the first delay-flip-flop VFI emits a (m+1)-th bit word BW to an input E of a storage module SP, to an input D of a second delay-flip-flop VF2, and to an undesignated input of a EXCLUSIVE-OR-gate EOD1. Via a second OR-gate OD2, the fourth clock pulse sequence T4 is supplied to a control input SE of the EXCLUSIVE-OR-gate EOD1.

The m-th bit word emitted from an output A of the storage module SP is supplied to a reset pulse input R of the first delay-flip-flop VF1. The second pulse sequence T2 is supplied to write-read command input SL of the storage module SP. The storage module SP, which contains the store locations known from FIG. 1, consists, for example, of a so-called RAM-module. Via a first OR-gate OD1 the third clock pulse sequence T3 is supplied to an output control input AS of the storage module SP.

The address AD emitted by the clock- and address preparation stage TA is supplied to an address input AE of the storage module SP, to a first input E1 of a first comparator stage V1, and to a first input E1 of a second comparator stage V2. The preceding address VAD is supplied to an input D of a first register RG1, whose clock input is connected to an output A of the EXCLUSIVE-OR-gate EOD1. An output Q supplies the content of the first register RG1 to a second input E2 of the first comparator stage V1 and to an input D of a second register RG2. An output Q supplies the content of the second register RG2 to a second input E2 of the second comparator stage V2. The comparator stages V1 and V2 each emit a pulse at their outputs A when the same addresses occur at their first and second inputs E1, E2.

Via a divider stage TE1, which for example has a division ratio of 2 to 1, the output A of the first comparator stage V1 is connected to clock inputs of a counter Z, a fifth, a sixth and a seventh delay-flip-flop VF5, VF6, VF7. An output A of a counter Z, which emits a signal after a predetermined number of pulses have occurred at the clock input, is connected to clock inputs of the second register RG2 and the second delay-flip-flop VF2. A reset pulse input R of the fifth delay-flip-flop VF5 is connected via a second converter J2 from the output A of the EXCLUSIVE-OR-gate EOD1.

An output Q of the second delay-flip-flop VF2 emits the (m+1)-th bit word BW to an input E of a parallel-series converter PSW, at whose undesignated control inputs the clock drive pulses Q1 to Q3 are supplied. An output A of the parallel-series converter PSW is connected to an input of an AND-gate UD1, whose other input is connected to the output A of the second comparator stage V2.

The clock pulse sequence TO, emitted by the clock generator TG, is fed v? a a first inverter J1 to the clock inputs of a third and fourth delay-flip-flop VF3, VF4. The third delay-flip-flop VF3 has an input D to which output A of the AND-gate UD1 is connected and an inverting output $\bar{Q}$, from which the synchronizing signal SS is emitted. The fourth delay-flip-flop VF4 has an input D which can be connected to one of the inputs D1 to D7 of the series-parallel converter SPW, and an output Q from which the delayed bit flow VBS is emitted. Here, the inputs D1 to D7 of the series-parallel converter SPW represent the higher-value seven inputs of the eight-stage shift register or the low-value seven outputs of the individual stages.

The fifth delay-flip-flop VF5 has an input D, to which a logic "1" is supplied, and an output Q which is connected to an input D of the sixth delay-flip-flop VF6. An output Q of the sixth delay-flip-flop VF6 is connected to an input of a NAND-gate or inverting AND-gate UD2, to an input of the first OR-gate OD1, and to an input of the second OR-gate OD2. An inverted output $\bar{Q}$ of the sixth delay-flip-flop VF6 is connected to a reset pulse input R of the counter stage Z.

The third clock pulse sequence T3 is supplied to the other input of the first OR-gate OD1, whose output is connected to the output control input AS of the storage module SP. The fourth clock pulse sequence T4 is supplied to the other input of the second OR-gate OD2, whose output is connected to the control input SE of the EXCLUSIVE-OR-gate EOD1. The third and fourth clock pulse sequences T3, T4 can be gated out by a logic "1" at the first inputs of the OR-gates OD1 and OD2.

The output Q of the sixth delay-flip-flop VF6 is also connected to an input D of the seventh delay-flip-flop VF7, whose output Q is connected to the other input of the inverting AND-gate UD2. The output of the inverting AND-gate UD2 is connected to a reset pulse input R of the sixth delay-flip-flop VF6.

All the clock inputs of the modules shown in FIG. 2 are triggered with a rising flank of a clock pulse. The reset pulse inputs R of the delay-flip-flops VF1 to VF7 and the control input SE of the EXCLUSIVE-OR-gate EOD1 are active to reset the respective units in the case of a logic "0". When a logic "0" is supplied to the output control input AS of the storage module SP, the m-th bit word BW is emitted from its output A. When a logic "1" occurs at the output control input AS, the output A is switched high-ohmic, i.e. the output of the data is blocked.

The circuit components represented by broken lines in FIG. 2 will be described later in the description.

FIGS. 3 and 4 represent pulses and states occurring at some of the terminals of the modules shown in FIG. 2. In each row these indicate the terminal and the signal occurring on the associated line respectively, quoting the associated module in brackets. Signals shown in FIG. 4 have the same time reference within individual groups, such groups being defined and separated by dashed lines in the left-hand column.

The mode of operation of the decoding circuit arrangement represented in FIG. 2 will be explained in the following making reference to the signals shown in FIGS. 3 and 4.

A series bit flow BS is emitted from the signal source SQ. At one location the bit flow BS comprises the synchronizing bit S which indicates the start of a frame. In FIG. 3, the synchronizing bit S is contained in a (m+1)-th search frame SR. The search frame SR contains the same number of bits as the frame, for example, 1080 bits. The start of the search frame SR is arbitrarily determined by the switch-on time of the frame decoding circuit arrangement.

The bit flow BW is converted by the series-parallel converter SPW into bit words BW which have a breadth of eight bits. By way of explanation, FIG. 3 represents eight consecutive bits numbered 0 to 7. It will be assumed that bit number 1 is set at logic "0" and bit number 3 and 5—where bit number 5 is the synchronizing bit S—are each set at logic "1".

The clock pulse sequence TO is supplied by the clock generator TG. Consecutive clock flanks of the clock pulse sequence TO are characterized by periodic times t0 and t16. Here the time t16 of the first group of rows of FIG. 4 corresponds to the time t2O of the next group of rows of FIG. 4. Bit number 0 is sampled at time t1 with a rising flank of the clock pulse sequence TO.

The clock pulse sequences T1 to T4 are supplied by the clock- and address preparation stage TA. The first clock pulse sequence T1 is set at logic "0" between the times t0 and t1 but otherwise at logic "1". The second clock pulse sequence T2 is set at logic "1" between the times t0 and t8 and at logic "0" between the times t8 and t16. The third clock pulse sequence T3 is set at logic "0" between the times t4 and t8 and at logic "1" between the times t8 and t24. The fourth clock pulse sequence is set at logic "1" between the times t0 and t12 and at logic "0" between the times t12 and t16. The form of the clock pulse sequences T1 and T4 is repeated periodically.

The address AD is supplied by the clock- and address preparation stage TA. The address AD is changed at times t0 and t16, and t2O. Between the times t0 and t16 the address AD=x−1 is emitted and between the times t2O and t36 the address AD=x is emitted. In the aforementioned example in which the frame contains 1080 bits, 135 addresses AD (1080/8=135) of AD=0 to AD=134 are emitted, which are cyclically formed by the clock- and address preparation stage TA.

The bit word BW, emitted by the series-parallel converter SPW, occurs at the input D of the first delay-flip-flop VF1. The bits of the bit flow BS, numbered 0 to 7, are here contained in the bit word BW, e.g., m+1, which bears the number m+1. The number of the bit word BW relates to the number of the search frame SR to which it is identical. The m-th bit word BW is situated at the same location in the m-th search frame SR as the (m+1)-th bit word BW in the (m+1)-th search frame SR. These locations are marked by the addresses AD.

From the time t21 onwards, this bit word BW bearing the number m+1 can be tapped from the output Q of the first delay-flip-flop VF1. From the time t2O onwards, the address AD=x occurs at the address input AE of the storage module SP. Likewise, from the time t2O onwards, a logic "1" of the second clock pulse sequence T2 occurs at the write-read command input SL of the storage module SP, whereby the storage module SP is prepared to read data. Here a state is being considered in which, from the time t24 onwards, a logic "0" of the third clock pulse sequence t3 occurs at the output control input AS of the storage module SP, to enable the output, i.e. the first OR-gate OD1 switches through the third clock pulse sequence t3 unchanged. This ensures that from the time t24 onwards, the bit word BW, addressed by the address AD=x, can be tapped from the output A of the storage module SP. In FIG. 3, this bit word BW bears the number m.

Thus, from the time t24 onwards, the m-th bit word BW occurs at the reset pulse input R of the first delay-flip-flop VF1. This ensures that, in the (m+1)-th bit word BW which can be tapped from the output Q of the first delay-flip-flop VF1, the only bits which are not set at logic "0" are those whose place in the m-th bit word BW is represented by a logic "1". As already explained in the description of the fundamental principle of the invention making reference to FIG. 1, a logic AND-link (conjunction) of the m-th bit word BW with the (m+1)-th bit word takes place.

Following the logic AND-link, the result is input as (m+1)-th bit word BW into the store location bearing the address AD=x. This is effected by the logic "0" of the second clock pulse sequence T2 which occurs from the time T28 onwards at the write-read command input SL, and the address AD=x which is still present at the address input AE.

The logic AND-link of the m-th bit word BW to the (m+1)-th bit word BW which follows (in time) is performed analogously for all the bit words BW for the addresses AD=0 to AD=134. In this way, in the entire search frame SR, a search is carried out for the synchronizing bit S, which is the only bit which is still set at logic "1".

The (m+1)-th bit word BW, which is input into the storage module SP at the time t28, also occurs at the inputs of the EXCLUSIVE-OR-gate EOD1. If, as in the numerical example selected in FIG. 3, the (m+1)-th bit word BW contains only one bit set at logic "1" (see bit number 5, the synchonizing bit S in FIG. 3), a positive pulse is emitted from the output A of the EXCLUSIVE-OR-gate EOD1. The rising flank of this pulse at a time t32 is governed by the fourth clock pulse sequence T4 which occurs at a control input SE of the EXCLUSIVE-OR-gate EOD1 and which is set at logic "0" from this time t32 onwards. Here, a state is being considered in which the second OR-gate OD2 switches through the fourth clock pulse sequence T4 unchanged.

With the assistance of the EXCLUSIVE-OR-gate EOD1 it has been established that in one of the bit words BW only one bit location is set at logic "1". It must now also be established whether the (m+1)-th bit word BW is the only bit word BW within a search frame SR which contains a bit location set at logic "1". This is determined with the assistance of the first register RG1 and the first comparator stage V1, using the preceding address VAD.

As can be seen from FIG. 4, within a search frame SR the clock- and address preparation stage TA emits, one beside another, the address AD=x and y and preceding address VAD=x−1 and y−1 respectively. The positive pulses emitted from the output A of the EXCLUSIVE-OR-gate EOD1 at the times t32 and t52 cause the preceding address VAD=x−1 to be transferred at these times t32, t52 into the first register RG1. Therefore, from the time t32 onwards the preceding address VAD=x−1 can be tapped from the output Q of the first register RG1. In a first situation in which the (m+1)-th bit word BW with the address AD=x in the search frame SR number n is the only bit word containing a bit location set at logic "1", from a time t60 onwards two identical addresses occur at the first comparator stage V1. The address AD=x−1 from the clock- and address preparation stage TA occurs at its first input E1, and the preceding address VAD=x−1 from the output Q of the first register RG1 occurs at its second input E2. This ensures that the first comparator stage V1 emits, at its output A, a positive pulse which continues until the next change of address. It should be noted that any address occurring prior to the address AD=x can serve as preceding address VAD. The address VAD=x−1 which directly precedes the address AD=x is particularly suitable for adapting the synchronizing signal SS to the delayed bit flow VBS. It is also conceivable that an address which follows the address AD=x should serve as preceding address VAD.

In a second situation in which the (m+1)-th bit word BW with the address AD=x in search frame number n is not the only bit word BW containing a bit location set at logic "1", for example at an undesignated time the preceding address VAD=y−1 is transferred into the first register RG1. In this case another (m+1)-th bit word BW containing only one logic "1" has been found. This bit word BW is assigned to the address AD=y. Since, during the time in which the address AD=x−1, emitted from the clock- and address preparation stage TA, occurs at the first input E1 of the first comparator stage V1, the preceding address VAD=y−1 occurs at the second input E2 of the first comparator stage V1, the first comparator stage V1 does not emit a pulse at its output A. The same applies to the time during which the address AD=y−1, emitted by the clock- and address preparation stage TA, occurs at the first input E1 of the first comparator stage V1 and the preceding address VAD=x−1 contained in the first register RG1 occurs at its second input E2.

In a divider stage TE1 the pulses emitted from the output A of the first comparator stage V1 are divided, for example, in a ratio of 2 to 1 and are fed to the clock input of the counter Z. Following, for example, thirty pulses at the output A of the first comparator stage V1, i.e. following fifteen pulses at the clock input of the counter Z, at its output A the counter Z emits a pulse which triggers the clock input of the second register RG2. With this pulse the preceding address VAD, which can be tapped from the output Q of the first register RG1, is transferred into the second register RG2. Thus, following this pulse the preceding address VAD is transferred from the output Q of the second register RG2 to the second input E2 of the second comparator stage V2.

The counter Z serves to increase the resistance to disturbances of the frame decoding circuit arrangement in accordance with the invention. Not until a single bit, set at logic "1", in a bit word BW has been recognized several times and not until the single bit word BW of this kind has been recognized in a search frame SR, is this bit identified as a synchronizing bit S.

From a time t80 onwards, the address AD=x−1, emitted from the clock- and address preparation stage TA, occurs at the first input E1 of the second comparator stage V2 and the preceding address VAD=x−1, stored in the register R2, occurs at the second input of the second comparator stage V2. Thus, from the time t80 onwards, the second comparator stage V2 emits a postive pulse at its output A. This pulse continues until the next change of address.

In the following, further reference will be made to FIG. 3 in explanation of the circuit arrangement illustrated in FIG. 2. At a time t70 a positive pulse is emitted from the output A of the counter Z. This pulse also occurs at the clock input of the second delay-flip-flop VF2 which at this time receives the (m+1)-th bit word BW. This bit word BW is supplied from the output Q of the second delay-flip-flop VF2 to the input E of the parallel-series converter PSW. From the bits bearing the numbers 0 to 7, where bit number 5 is the synchronizing bit S, the parallel-series converter PSW now forms a series bit sequence of the bits numbered 0 to 7. This bit sequence, which is characterized by a positive pulse corresponding to the synchronizing bit S, is periodically transferred from the output A of the parallel-series converter PSW to the AND-gate UD1.

The bit sequence emitted from the output A of the parallel-series converter PSW is also represented in FIG. 4. A time window is formed by the pulse which is emitted from the output A of the second comparator stage V2 and which is likewise applied to the AND-gate UD1.

One of the periodic pulses which can be tapped from the output A of the parallel-series converter PSW is selected through this time window and can be tapped from the output A of the AND-gate UD1 as synchronizing signal SS.

The delayed bit flow VBS is generated via the fourth delay-flip-flop VF4. The length of time by which the delayed bit flow VBS is delayed relative to the bit flow BS can be set on the one hand by selecting the time difference between the emission of the address AD and the preceding address VAD by the clock- and address preparation stage TA, and on the other hand by selectively connecting the input D of the fourth delay-flip-flop VF4 to one of the inputs D1–D7 of the series-parallel converter SPW. For this purpose the fourth delay-flip-flop VF4 is triggered by the falling flanks of the clock pulses sequence TO.

The third delay-flip-flop VF3 is likewise triggered by the falling flanks of the clock pulse sequence TO. Via the third delay-flip-flop VF3, the synchronizing signal SS emitted from the output A of the AND-gate UD1 is synchronized to the falling flanks of the clock pulse sequence TO and is thus synchronous with the synchronizing bits S in the delayed bit flow VBS.

The start of the frame decoding procedure and the behaviour of the circuit arrangement corresponding to the invention in the event of the loss of the synchronizing bit S, for example as a result of a disturbance, will be described in the following.

When the frame decoding circuit arrangement corresponding to the invention has been connected to a current supply, the first register RG1 contains a random transferred, preceding address VAD=x−1. When the clock- and address preparation stage TA emits the address AD=x−1, a pulse is emitted from the output A of the first comparator stage V1. After every such second pulse, by virtue of the fact that the divider stage TE1 is operating in a ratio of 2 to 1, the logic "1" present at the input D of the fifth delay-flip-flop VF5 is switched through to its output Q. This logic "1" now occurs at the input D of the sixth delay-flip-flop VF6. After a further two pulses at the output A of the first comparator stage V1, this logic "1" is switched through to the output Q of the sixth delay-flip-flop VF6. As a result of the logic "1" which can be tapped from the output Q of the sixth delay-flip-flop VF6 and which occurs at the first inputs of the OR-gates OD1 and OD2, the third clock pulse sequence T3 is cut off from the output control input AS of the storage module SP and the fourth clock pulse sequence T4 is cut off from the control input SE of the EXCLUSIVE-OR-gate EOD1. As already described, these two last mentioned control inputs are active when a logic "0" occurs.

For such time as a logic "1" appears at the output Q of the sixth delay-flip-flop VF6, the counter stage Z is or remains reset via an inverting output $\overline{Q}$ from VF6.

The intervals of time in which the pulses occur at the output A of the first comparator stage V1 each correspond to one frame length of the series bit flow BS. The logic "1", which can be tapped from the output Q of the sixth delay-flip-flop VF6, also occurs at the input D of the seventh delay-flip-flop VF7. Following two further pulses at the output A of the first comparator stage V1, i.e. after two frame lengths, the logic "1" is switched through from the output D to the output Q of the seventh delay-flip-flop VF7 and is fed to the other input of the inverting AND-gate UD2, at whose first input the logic "1", emitted from the output Q of the sixth delay-flip-flop VF6, likewise occurs. This ensures that over a period of two frame lengths the storage module SP is loaded with bit words BW emitted from the series-parallel converter SPW via the first delay-flip-flop VF1.

After these two frame lengths, via the inverting AND-gate UD2, at whose two inputs a logic "1" now occurs, a logic "0" is fed to the reset pulse input R of the sixth delay-flip-flop VF6 as a result of which its output Q is set at logic "0". This ensures that the output control input AS of the storage module SP is driven by the third clock pulse sequence T3, and that the control input S of the EXCLUSIVE-OR-gate EOD1 is driven by the fourth clock pulse sequence T4. During the decoding procedure, within a search frame SR the EXCLUSIVE-OR-gate EOD1 continuously registers bit words BW which contain only one bit set at logic "1", although this bit does not constitute the synchronizing bit S. As a result, within a search frame SR the output A of the EXCLUSIVE-OR-gate EOD1 emits a plurality of pulses which are transferred via the second inverter J2 to the reset pulse input R of the fifth delay-flip-flop VF5. The output Q of the fifth delay-flip-flop VF5 is thereby set at logic "0", so that the logic "1" occurring at its input D is prevented from being switched through.

If, as already described, the synchronizing bit S has been found in the bit flow BS, only one pulse is emitted from the output A of the EXCLUSIVE-OR-gate EOD1 during a search frame SR. In the storage module SP only one of the addressed store location is set at logic "1", namely the store position into which the synchronizing bit S has been transferred. If, for example, as a result of disturbances on the transmission link this synchronizing bit S is lost, i.e. the logic "1" of the synchronizing bit S is set at logic "0", the associated store location in the storage module SP is also overwritten by logic "0". As has been explained in the description of the mode of operation of the decoding circuit arrangement in accordance with the invention, during the decoding procedure logic ones in the storage module SB can be overwritten by logic zeros, present at its input E, at bit locations of the (m+1)-th bit word BW.

As the addressed store locations in the storage module SP now contain only logic zeros, no further pulses are emitted from the output A of the EXCLUSIVE-OR-gate EOD1 and the fifth delay-flip-flop VF5 is no longer reset. As already described in respect of the switch-on procedure, as a result of the pulses emitted from the output A of the first comparator stage V1, the output Q of the fifth delay-flip-flop VF5 and then, after two further pulses, the output Q of the sixth delay-flip-flop VF6 is set at logic "1", thus facilitating the transfer of the bits of the series bit flow BS, i.e. of the associated bit words BW, into the storage module SP for a period of two frame lengths. Pulses continue to be emitted from the output A of the first comparator stage V1 because the first register RG1 contains a preceding address VAD=x−1 which, within each search frame, is also emitted as address AD=x−1 from the clock- and address preparation stage TA.

In the circuit arrangement illustrated in FIG. 2, the time switching stage ZS in FIG. 1 is formed by the fifth to seventh delay-flip-flops VF5–VF7, in association with the output A of the first comparator stage V1.

The modules represented in broken lines in FIG. 2, their connections, and their mode of functioning will be explained in the following. Here, it will be assumed that the series bit flow BS is converted not into bit words BW having a breadth of eight bits, but into two sets of bit words have a breadth of four bits.

Thus, in the following example, as described above, the eight bits of the bit word BW are not emitted from the output QA of the series-parallel converter SPW, but in fact the first four bits of the bit word BW are emitted as first half-word BWA from the output QA, and the second four bits of the bit word BW are emitted as second half-word BWB from an output QB of the series-parallel converter SPW. Via a multiplexer MX, in a first switching state as bit word BW the first half-word BWA is transferred to the input D of the first delay-flipflop VF1 and in a second switching state as bit word BW the second half-word BWB is transferred. As already explained, in this example the bit word BW has a breadth of four bits and a corresponding number of terminals are provided for the inputs D of the first and second delay-flip-flops VF1, VF2, the reset pulse input R of the first delay-flip-flop VF1, the input E and the output A of the storage module SP, and the input E of the parallel-series converter PSW. The input of the EXCLUSIVE-OR-gate EOD1 has four terminals.

Since at present RAM-modules for data words having a breadth of four bits are more easily obtainable than those for data words having a breadth of eight bits, the use of the former has advantages. Two so-called four-bit RAM-modules forming an 8-bit RAM-module have an increased power consumption. It is impossible to convert the bit flow BS into bit words BW having a breadth of four bits because the address zone of the RAM-module is too small. As already state, the bit flow BS contains 1080 bits in a frame. When conversion is carried out into bit words BW having a breadth of four bits, 270 addresses are produced. However, known 4-bit RAM-modules contain only 256 addressable store locations.

When the first and second half-word BWA, BWB are used as bit words BW, the frame decoding of the bit flow BS proceeds in an identical fashion to the frame decoding in which bit words BW having a breadth of eight bits are used.

Here, the synchronizing bit S, contained in the bit flow BS, is located either in one of the first half-words BWA or in one of the second half-words BWB. In the frame decoding procedure a search is firstly carried out in the first or second half-word BWA, BWB and then, if the synchronizing bit S has not been found in the latter, in the second or first half-word BWB, BWA.

The additional circuit components required for the half-word version will be described in the following.

This consists of the above-described multiplexer MX which has an input selector input EW via which one of the undesignated inputs of the multiplexer MX is switched through to its likewise undesignated output. The output Q of the sixth delay-flip-flop VF6 is connected via a further divider stage TE2, which has a division ratio of 2 to 1, to a further input D4 of the second delay-flip-flop VF2 and to the input selector input EW of the multiplexer MX. In the half-word version, the input designated D of the second delay-flip-flop VF2 has the terminals D0 to D3. A similar description applies to the output Q of the second delay-flip-flop VF2. A further output Q4 of the second delay-flip-flop VF2 is connected to an input of a further EXCLUSIVE-OR-gate EOD2, at whose other input the third clock drive pulses Q3 occur. The signal emitted from the second EXCLUSIVE-OR-gate EOD2 occurs at a further input of the AND-gate UD1.

It will be assumed that when the frame decoding circuit arrangement has been connected to a current supply, a logic "1" is emitted from the further output Q4 of the second delay-flip-flop VF2. As a result of this logic "1" the first half-word BWA is switched through, for example, by the multiplexer MX.

In a first situation, the synchronizing bit S is located at a position in the bit flow BS which is converted into a second half-word BWB. Therefore, in the decoding procedure, i.e. in the search for the synchonizing bit S in the first half-words BWA, the synchronizing bit S is not found.

Here, the same procedure takes place as already described in the case of a loss of the synchronizing bit S. As not synchronizing bit S is found in the first half-words BWA, finally the storage module SP contains only logic zeros. This causes a logic "1" to occur at the output Q of the sixth delay-flip-flop VF6, as the fifth delay-flip-flop is no longer reset by the EXCLUSIVE-OR-gate EOD1. It will be assumed that via a further divider stage TE2 this logic "1", i.e. the change to the logic "1", causes a logic "0" to appear at the input selector input EW of the multiplexer MX.

As a result of the logic "0" at the input selector input EW of the multiplexer MX, the latter switches through the second half-word BWB. Then a search procedure is carried out which concludes with the discovery of the synchronizing bit S in the second half-words BWB. As already described in the foregoing, with respect to the bit words BW which have breadth of eight bits, the count of the counter Z increases and causes the occurring (m+1)-th second half-word BWB, and the logic "0" emitted from the further divider stage TE2, to be transferred into the second delay-flip-flop VF2. As a result of the appearance of the logic "0" at the further output Q4 of the second delay-flip-flop VF2, the third clock drive pulses Q3 are transferred in non-inverted form via the further EXCLUSIVE-OR-gate EOD2 to the AND-gate UD1.

The continuing description will again make reference to FIG. 4. In the half-word version, within an address AD=x−1, two pulses are emitted from the output A of the parallel-series converter PSW. In comparison to a bit word BW, having a breadth of eight bits, at the input E of the parallel-series converter PSW, the conversion of a bit word BW having a breadth of four bits requires only half the length of time. Of these two pulses only the pulse which in this case is assigned to the second half-word must be assumed to represent the synchronizing signal SS.

Via the output signal of the further EXCLUSIVE-OR-gate EOD2, within an address AD of the second of the two pulses emitted from the output A of the parallel-series converter PSW is selected and is emitted from the output A of the AND-gate UD1 as synchronizing signal SS.

In a second situation the synchronizing bit S is located at a position in the bit flow BS which is converted into a first half-word BWA. In the decoding procedure, i.e. in the search for the synchronizing bit S in the first half-words BWA, the synchronizing bit S is discovered as described in the foregoing, with reference to the bit word BW which has a breadth of eight bits.

Because, in this case, the logic "1" can be tapped from the further output Q4 of the second delay-flip-flop VF2, the third clock drive pulses Q3 are transferred in inverted form via the further EXCLUSIVE-OR-gate EOD2 to the AND-gate UD1. As a result, within an address AD, the first of the two pulses emitted from the output A of the parallel-series converter PSW is selected and emitted from the output A of the AND-gate UD1 and synchronizing signal SS. This situation is not represented in FIG. 4.

Similar procedures take place if, as a result of other logic states at the input D4 and further output Q4 of the second delay-flip-flop VF2, the sequence of the half-words BWA and BWB, in which a search for a synchronizing bit S is carried out, is reversed.

It is apparent that various modifications and additions may be made in the present invention without departing from the essential features of novelty thereof, which are intended to be defined and secured by the appended claims.

What is claimed is:

1. A method of frame decoding, in particular in a multiplexer-demultiplexer system for digital signal transmission, wherein a series data bit flow (BS) has a frame structure including a predetermined number of data bits for each data frame and a periodically occurring item of synchronizing information which characterizes the start of each frame, comprising the steps of;

using a synchronizing bit (S) as said synchronizing information, commencing with a m-th search frame (SR) and with the following (m+1)-th search frame (SR), where each (m)-th search frame (SR) contains the same number of data bits of said data bit flow as each said data frame, performing a logic AND-link between corresponding bits in consecutive search frames, and using the result to form the (m+1)-th search frame (SR), determining when only one bit, the synchronizing bit (S), in the (m+1)-th search frame (SR) is set at a logic "1" and retaining this setting for a plurality of search frames (SR), generating a sychronizing signal (SS) in accordance with the time position of the synchronizing bit (S), and delaying the bit flow (BS) and/or the synchronizing signal (SS) so that the synchronizing signal (SS) and the synchronizing bit (S) occur in synchronism in a delayed bit flow (VBS).

2. The method as claimed in claim 1, including the steps of sub-dividing said search frame (SR) into sections, and performing said AND-link with corresponding groups of bits which assume the same position in the consecutive search frames (SR).

3. The method as claimed in claim 1 or 2, including the steps of performing each of said AND-links with r-th sections of the consecutive search frames (SR), and performing subsequent AND-links with the (r+1)-th sections of the consecutive search frames (SR) in the event that the result of the last logic-link of the r-th sections contains bits exclusively set at logic zeros.

4. In a circuit arrangement for frame decoding, in particular in a system for digital signal transmission, wherein a series data bit flow (BS) has a frame structure and a periodically occurring item of synchronizing information which characterizes the start of each frame, the combination comprising;

clock pulse generator means (TG) for generating a clock pulse sequence (TO), a series-parallel converter stage (SPS) for converting the bit flow (BS) into parallel bit words (BW) corresponding to search frames each defined by a plurality of data bits of said flow equal to the number of bits in a frame, where the bits of a search frame (SR) are represented in at least one bit word (BW), a plurality of AND gates and a plurality of store locations connected to the outputs of said AND-gates, means for supplying corresponding bits of said bit words (BW), to said AND-gates and for storing the result of this AND-link in said store locations (SPL), an EXCLUSIVE-OR-gate connected to receive the result of said AND-link and operative to emit a signal when a search frame (SR) contains only a single bit set at logic "1", a parallel-series converter stage, (PSS), means for connecting said EXCLUSIVE-OR-gate to the switching input of said parallel-series converted stage (PSS), whereby said converter stage provides, in response to said single bit, a series synchronizing signal (SS) and at least one delay stage in the signal path of the bit flow (BW) and/or the synchronizing signal (SS), whereby said synchronizing signal is synchronized with said bit flow.

5. A circuit arrangement as claimed in claim 4, wherein said series-parallel converter stage (SPS) includes a series-parallel converter (SPW) in which the bit flow (BS) is convertered into bit words (BW) having a breadth of n-bits, where the number of bits in a frame is an integral multiple of the number n, said plurality of store locations comprising a RAM-storage module (SP) having an output control input (AS), a clock- and address preparation stage (TA) connected to said clock pulse generator means and operative to form addresses (AD) in cyclic fashion, the number of the address corresponding to the number of bit words (BW) in a search frame (SR), and said AND-link being carried out using bit words (BW) previously stored at the same address (AD) in the storage module (SP), in which the result of said AND-link is stored, said AND-gates comprising a first delay-flip-flop (VF1) connected to receive the bit words (BW) and having an output connected to an input (E) of said storage module (SP), said first delay-flip-flop having a reset pulse input (R), means for connecting an output (A) of said storage module (SP) to said reset pulse input, whereby, as a result of the application of an m-th bit word (BW) with the address (AD)=x to the reset pulse input (R) of the first delay-flip-flop (VF1), an AND-link is performed with the (m+1)-th bit word (BW) which has the address (AD)=x and which can be tapped at the output (Q) of said first delay-flip-flop.

6. A circuit arrangement is claimed in claim 5, including an EXCLUSIVE-OR-gate (EOD1), means for connecting the input (E) of said storage module (SP) to said EXCLUSIVE-OR-gate, whereby an output (A) of said EXCLUSIVE-OR-gate (EOD1) emits a pulse in response to a bit word (BW) containing only one bit set at logic "1", a first register, means responsive to the output of said EXCLUSIVE-OR-gate for causing a preceding address (VAD), emitted by the clock- and address preparation stage (TA), to be transferred into said first register (RG1), a first comparator stage (Va) having a first input (E1) connected to receive the address (AD) and a second input (E2) connected to receive an output (Q) of said first register (RG1), said first comparator stag (V1) being operative to emit a signal from its output (A) when identical addresses occur at its inputs (E1, E2) to designate when, within a search frame (SR), one bit set at logic "1" (synchronizing bit (SS)) is found.

7. A circuit arrangement as claimed in claim 6, including
- a counter (Z) connected to the output (A) of said first comparator stage (V1), and operative to emit a signal at an output (A), following a predetermined number of signals emitted from said comparator stage,
- a second register (RG2) connected to said counter (Z) and responsive to said counter for transferring the preceding address (VAD) from said clock- and address preparation stage to said second register,
- a second comparator stage (V2) having a first input (E1) connected to receive the address (AD) and a second input (E2) connected to receive an output (Q) of the second register (RG2), said second comparator stage (V2) being operative to emit a signal at its output (A) when the same addresses occur at its inputs (E1, E2), to designate when the only bit set at logic "1" (synchronizing bit (S)) is found in as many search frames (SR) as said predetermined number.

8. A circuit arrangement as claimed in claim 7, wherein
- said parallel-series converter stage (PSS) includes a parallel-series converter (PSW) and a second delay-flip-flop (VF2) having its output connected to said parallel-series converter and its input connected to the input (E) of said storage module (SP), whereby the bit word (BW) occurring at the input (E) of said storage module (SP) is transferred to the parallel-series converter (PSW),
- said second delay-flip-flop having a switching input connected to receive the signal emitted from the output (A) of said counter (Z), said switching input being formed by a clock input of said second delay-flip-flop (VF2), and
- an AND-gate (UD1) having a first input connected to receive a series bit sequence, emitted from said parallel-series converter (PSW), and a second input connected to receive the signal emitted from the output (A) of the second comparator stage (V2), whereby the synchronizing signal (SS) is emitted from the output (A) of the AND-gate (UD1).

9. A circuit arrangement as claimed in one of the claims 5 to 8, including a multiplexer, means for supplying the n-bits of the bit word (BW) which has a breadth of n-bits via two outputs (QA, QB) of the series-parallel converter in the form of two sets of n/2 bits to inputs of said multiplexer (MX) whereby said multiplexer emits a first half-word (BWA) in a first switching state and a second half-word (BWB) in a second switching state, connected to the output of said multiplexer being operative to process the half-words (BWA, BWB) which have a breadth of n/2 bits in place of the bit words (BW) which have a breadth of n-bits, and including means for controlling said multiplexer so that following an unsuccessful search for the synchronizing bit (S) in one of the half-words (BWA or BWB), the search is continued in the respective other half-word (BWB or BWA).

10. A circuit arrangement as claimed in claim 9, wherein said bit words (BW) have a breadth of 8 bits.

* * * * *